United States Patent [19]

Roark

[11] 4,287,879

[45] Sep. 8, 1981

[54] WATER HEATING SYSTEM USING SOLAR ENERGY

[76] Inventor: Charles F. Roark, 24 Maple La., Brownsburg, Ind. 46112

[21] Appl. No.: 35,463

[22] Filed: May 3, 1979

Related U.S. Application Data

[62] Division of Ser. No. 810,888, Jun. 28, 1977, abandoned.

[51] Int. Cl.³ .............................................. F24J 3/02
[52] U.S. Cl. .................................. 126/437; 126/400; 126/435; 126/422; 126/452; 165/104.31
[58] Field of Search ............... 126/422, 427, 435, 437, 126/444, 445, 428, 452, 400, 390–392; 165/48 S, 169, 18, 104 S; 237/19; 122/32

[56] References Cited

U.S. PATENT DOCUMENTS

| | | | |
|---|---|---|---|
| 1,425,174 | 8/1922 | Cartter et al. | 126/434 |
| 3,335,789 | 8/1967 | Raskin | 165/169 |
| 3,382,917 | 5/1968 | Rice | 126/430 |
| 3,553,976 | 1/1971 | Cumine et al. | 165/169 |
| 3,739,842 | 6/1973 | Whalen | 165/169 |
| 3,831,246 | 8/1974 | Morris | 29/157.3 V |
| 4,010,734 | 3/1977 | Chayet | 126/437 |
| 4,015,586 | 4/1977 | Vroom et al. | 126/122 |
| 4,052,000 | 10/1977 | Honikman | 126/427 X |
| 4,054,981 | 10/1977 | Bridgegum | 126/437 X |

*Primary Examiner*—James C. Yeung
*Assistant Examiner*—Larry Jones

*Attorney, Agent, or Firm*—Woodard, Weikart, Emhardt & Naughton

[57] ABSTRACT

A water heating system includes a solar collector panel, a hot water heater tank, a serpentine tube-in-sheet heat exchanger jacket built into the water tank assembly, pumping means, fluid transfer means and means for securing the heat exchanger jacket around the hot water heater. The solar collector panel has a first passageway which lies beneath the outer surface of the panel such that incident solar energy is used to elevate the temperature of an energy-absorbing fluid which is circulating through this first passageway. The heat exchanger jacket is constructed with second and third passageways which are positioned in a double serpentine coil arrangement. The energy-absorbing fluid from the collector panel flows through connecting conduits to and from the second passageway. Water within the hot water heater is coupled to the third passageway and, as it circulates through the third passageway, this water is elevated in temperature by means of conduction from the energy-absorbing fluid. The energy-absorbing fluid, by raising the temperature of the heat exchanger jacket, also elevates the temperature of the water within the hot water heater by conduction through the wall of the hot water heater. Thus, two modes of heat transfer are used to heat the water within the hot water heater. Suitable pumps and valves are provided in order to control the flow of the fluids during the various climatic conditions.

22 Claims, 7 Drawing Figures

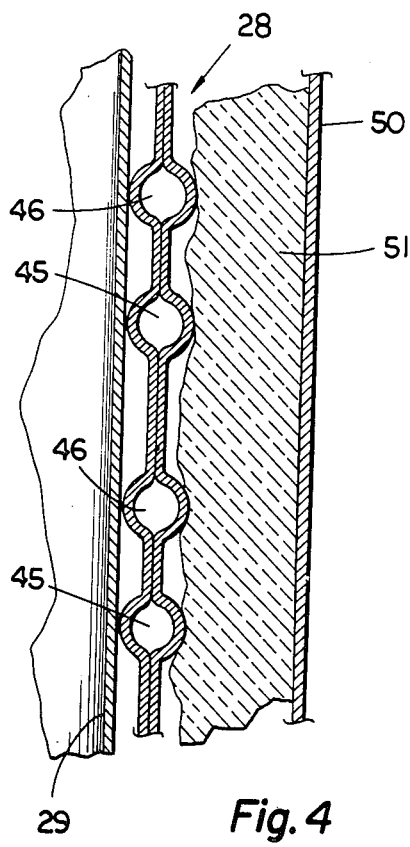
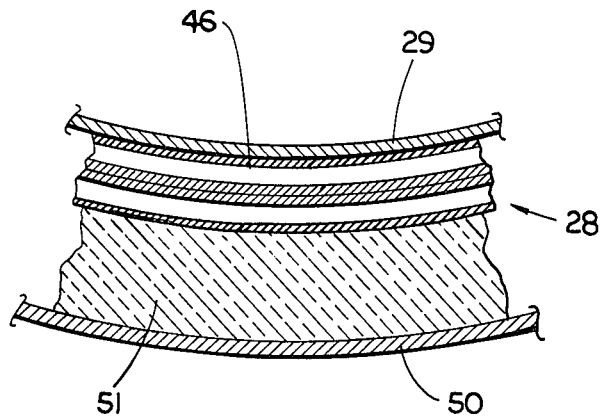
Fig. 5
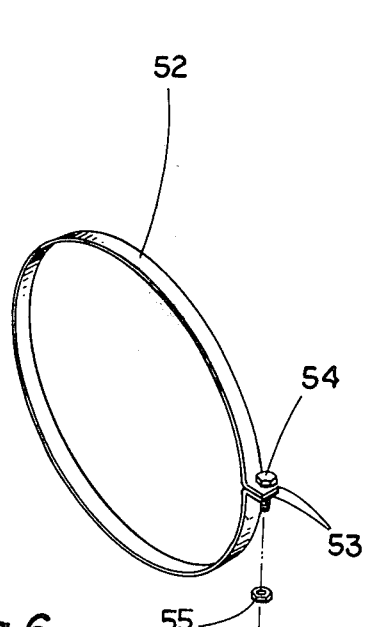
Fig. 6
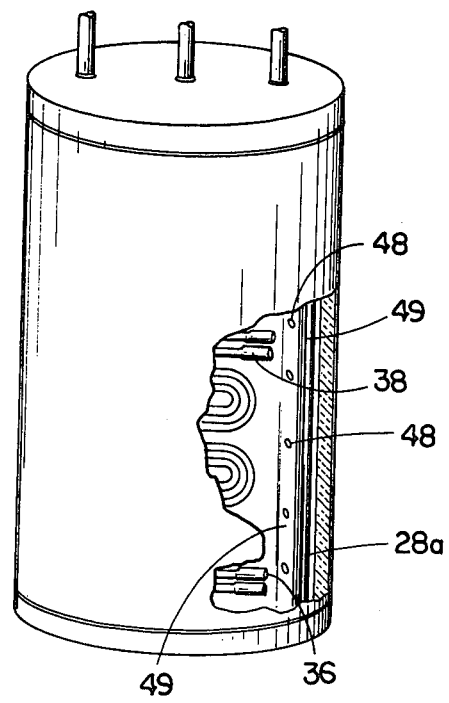
Fig. 7

WATER HEATING SYSTEM USING SOLAR ENERGY

This is a division, of application Ser. No. 810,888 filed June 28, 1977, now abandoned.

BACKGROUND OF THE INVENTION

1. Field of the Invention

This invention relates in general to water heating systems and in particular to such systems which utilize solar energy.

2. Description of the Prior Art

Solar energy devices which utilize the sun's radiant energy for heating some medium are well known in the art. Such devices may include an air-to-air heat transfer mode or air-to-liquid. Conventional solar energy collectors are often designed with a box-like enclosure covered with a glass pane or lens and having some type of flow conduit therethrough. As radiant energy strikes the surface of the glass pane or lens, a majority of the heat energy will be absorbed within and a minimum amount of heat energy will be reflected off and lost. As heat energy is absorbed within the box-like enclosure, the temperature of the medium flowing through the conduit will be elevated. This medium, very often water, is then transferred to a use location and/or placed in a storage container for use at a later time when there may not be sufficient sunlight to satisfy the heating demands. Of course, a conventional water storage container is a hot water heater which is normally thought of supplying hot water in response to electric or natural gas heating units. However, it is possible to supplement these electric or gas heating elements with solar energy thereby reducing the demand on the limited and more expensive forms of energy. One such system has been offered by State Industries, Inc. of Ashland City, Tennessee. This system is detailed in a "Solarcraft" brochure and utilizes an energy-absorbing fluid which circulates between the solar panel and a heat exchanger jacket which surrounds the water storage tank. A similar system has been offered by American Heliothermal Corporation of Denver, Colorado. This system which is detailed in a publication entitled "Residential Domestic Hot Water System," also incorporates an annular jacket positioned about the water tank and utilizes an energy-absorbing fluid to supplement the heating of the water within the tank.

Both of these systems involve a heat exchanger having a single passageway and a single fluid therein. The entire extent of the heat transfer to the water within the tank, which will ultimately be used at a remote location, is from the energy-absorbing fluid through the heat exchanger surface and then through the wall of the water storage tank. In order to heat all of the water within the tank, heat must be applied to the exterior of the tank for sufficient length of time in order to allow heat to transfer through the tank wall and then through the outer portions of water to reach the inner portions of water. Of course, with any solar energy system, the object is to retain and efficiently utilize as much of the radiant energy as possible. One way to do so, is to reduce thermal insulation between the energy absorbing fluid and the water so that unproductive heat dissipation is held to a minimum level.

SUMMARY OF THE INVENTION

One embodiment of the present invention comprises a solar collector panel, a hot water heater having a storage tank, a heat exchanger jacket built into the heater assembly, pumping means, fluid transfer means and means for circumferentially securing the heat exchanger jacket around the hot water heater tank. The solar collector panel has a first passageway cooperating therewith, and the heat exchanger jacket has therein a second passageway and a third passageway. The second passageway couples in a continuous flow loop with the first passageway and the continuous flow loop has a working fluid therein. The pumping means is operable to circulate the working fluid through the continuous flow loop. The fluid transfer means is operable to circulate water from within the storage tank through the third passageway and back into the storage tank.

One object of the present invention is to provide an improved water heating system.

Related objects and advantages of the present invention will be apparent from the following description.

BRIEF DESCRIPTION OF THE DRAWINGS

FIG. 4 is a sectional view of the heat exchanger jacket taken along 4—4 in FIG. 2.

FIG. 5 is a sectional view of the hot water heater taken along 5—5 in FIG. 2.

FIG. 6 is a perspective view of a band clamp comprising a portion of the FIG. 1 water heating system.

FIG. 7 is a perspective view of an alternate heat exchanger jacket associated with the water heating system.

DESCRIPTION OF THE PREFERRED EMBODIMENT

Figure 1:
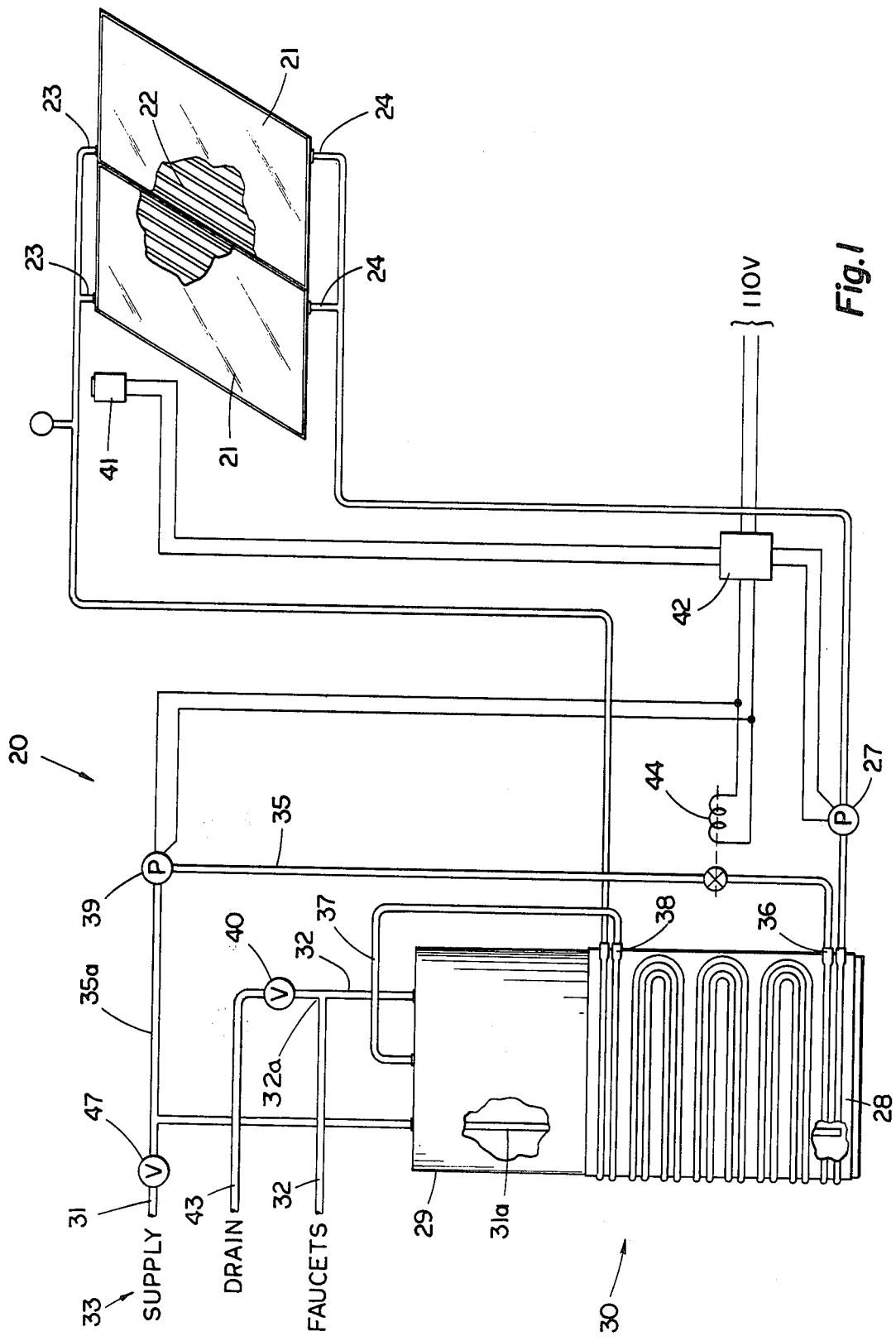
FIG. 1 is a schematic diagram of a water heating system according to a typical embodiment of the present invention.
Figure 2:
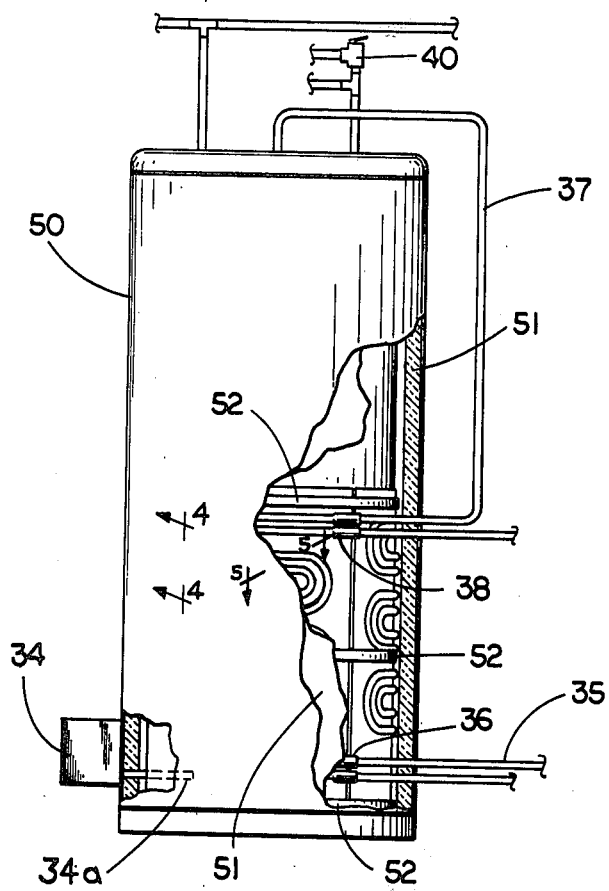
FIG. 2 is a elevational view of a hot water heater assembly with a portion in section to show internal features.
Figure 3:
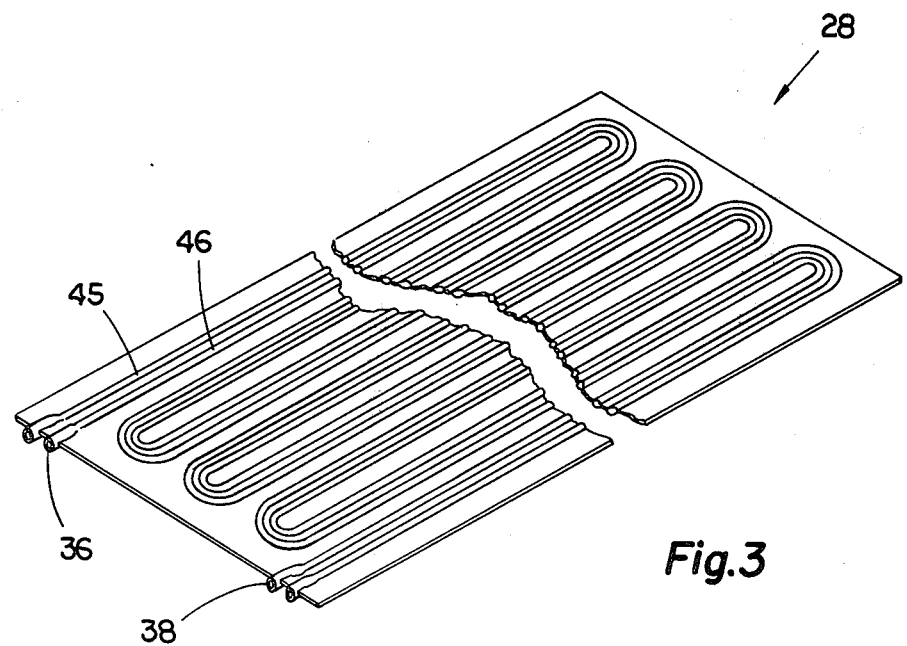
FIG. 3 is a perspective of a heat exchanger jacket in the flat state prior to curing around the water tank in FIG. 2 of the water heating system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, water heating system 20 is arranged with its various electrical and fluid connections as it would be when employed as part of a residential (or business) hot water delivery system. Inasmuch as water heating system 20 utilizes solar energy to supplement the more conventional forms of energy such as natural gas and electricity to heat water, solar collector panels 21 are required for the absorption of incident solar radiation. Although two such panels are shown, size and number of panels depends upon the geographical location of the system, the interval durations of incident sunlight and the amounts of hot water required. In areas where sunlight is limited, a greater collecting area will be required in order to capture sufficient heat. Likewise, if there are large amounts of hot water required, additional panels will improve system operation and system recovery. Any commercially available solar collector panel may be acceptable for use with this water heating system so long as there is a passageway 22 which extends through the collector panel and a suitable inlet port 23 and outlet port 24 connecting to this passageway so that energy absorbing (working) fluid is able to be circulated through the passageway. A suitable working fluid for this water heating system is Q2-1132 silicone heat transfer fluid produced by Dow Corning Corporation; Midland, Michigan.

By means of pump 27, relatively cool, energy-absorbing fluid entering inlet port 23 will be circulated through passageway 22 as heat from within collector panel 21 is transferred to this fluid. The fluid exiting the collector panel through outlet port 24 will be at an elevated temperature and will be circulated to heat exchanger jacket 28 which surrounds the inner storage tank 29 of a conventional hot water heater assembly 30.

Hot water heater assembly 30 is connected to a supply source 33 of cold water, such as a public water main, by means of pipe 31. Once heated, hot water is able to be withdrawn from heater assembly 30 in response to the opening of a faucet valve or the like such as, for example, at a kitchen sink. Pipe 32 which exits from heater assembly 30 is shown as the supply line to the faucet valve. Pipes 35 and 35a connect the water inlet tube 36 of heat exchanger jacket 28, pipe 31, and pipe 37 connects the hot water outlet tube 38 of heat exchanger jacket 28 to storage tank 29. In this arrangement, cold water is supplied to hot water heater assembly 30 by means of pipe 31 as hot water is used. Cold water from source 33 will normally enter the tank primarily through vertical pipe 31a extending to a point near the tank bottom. It may also pass through pipe 35a, pump 39, pipe 35, jacket 28 and pipe 37 into the tank, particularly if the pump is running. With the working fluid at an elevated temperature and circulated through jacket 28, the cold water entering jacket 28 by pipe 35 will be heated by thermal conduction from the working fluid. Thus the water emptied into tank 29 by pipe 37 will be at an elevated temperature. The cold water introduced directly into storage tank 29 enters through pipe 31a at a location adjacent the bottom. By means of heat exchanger jacket 28 and the circulating fluid therein which is at an elevated temperature, heat is transferred to the water within tank 29 by two modes. First heat is transferred to the water in tank 29 by thermal conduction from the working fluid through jacket 28 and through the tank wall. Secondly, heat from the working fluid is transferred to the water within jacket 28 which circulates through tank 29.

As cooler water is introduced into tank 29, it will orient itself toward the lower portion of the tank, with the hotter water above it. Thus with supply source 33 shut off and pump 39 energized, cooler water is drawn out of the lower portion of tank 29 through pipe 31a and is pumped to water inlet tube 36 of jacket 28. As this water circulates and is heated, it reenters tank 29 at the upper portion where the hotter water is located. Thus, as this circulated and heated water is reintroduced into tank 29, the effect is to aid the conduction action through the tank wall to more rapidly heat the water within tank 29.

Inasmuch as most of the features of hot water heater assembly 30 may be of a conventional design, it is equipped with three pipe fittings. One fitting is for cold water inlet, which is provided through pipe 31a. The second is for hot water out and to which pipe 32 is connected as previously described. The third is for a relief valve. However, in implementing the present invention, the third fitting is used for connecting to the hot water outlet pipe 27 from jacket 28. Therefore, drain pipe 43 and relief valve 40 are connected to the hot water outlet at a tee fitting 32a and provide a safety release in the event internal pressure builds to an unsafe level.

Pumps 27 and 39 are constructed with a single inlet port and a single outlet port and are energized electrically from a conventional 110 volt house current. Such pumps are well known in the art and further details of the mechanical and electrical features are not thought necessary.

Inasmuch as water heating system 20 utilizes solar energy as a supplemental form of energy, the ability to heat the working fluid circulating through solar collector panels 21 is dependent on the presence of sunlight. When there are cloudy, overcast or darkened conditions, there will not likely be sufficient solar radiation incident upon the surface of solar collector panels 21 to elevate the temperature of working fluid circulating therethrough to a level suitable to maintain or to increase the temperature of the water in the heat exchanger jacket and in the hot water heater. Therefore, positioned within the solar collector panels may be a photo-electric sensor or, more likely, a temperature-sensing device, such as, a thermostat 41. Although in actual use, thermostat 41 is positioned within one solar collector panel 21, for drawing clarity herein thermostat 41 has been located external to solar collector panels 21 so that the various electrical connections can be shown. Once a desired temperature for the working fluid has been decided upon, such as, for example, 150° F., the thermostat is set to this level. When there is insufficient sunlight and thus insufficient heat absorbed within the panels to reach this threshhold temperature, the thermostat 41 will respond and send an electrical signal to relay 42 which in turn deenergizes and shuts off pumps 27 and 39. With pump 27 shut off, working fluid will not be delivered to the heat exchanger jacket and a heat transfer loss from the water to the working fluid will not result.

Additionally, in order to prevent water flow in either direction through deactivated pump 39 and the water passageway of heat exchanger jacket 28, a solenoid valve 44 controlled by relay 42 is placed in the heat exchanger jacket water path and closes pipe 35 at the same time pumps 27 and 39 are shut off. One-way check valve 47 in supply pipe 31 prevents back flow of water into the supply source at any time.

Heat exchanger jacket 28 may be constructed of two copper plates or sheets fused together and which have been formed with matching semicircular passageways in order to form a heat exchanger jacket having a double serpentine coil. One serpentine passageway 45 carries working fluid and the other serpentine passageway 46 which connects between inlet tube 36 and outlet tube 38 carries water. This type of heat exchanger jacket may be formed in conventional manner using the Olin-Brass Corporation "Roll Bond" construction known in the art.

FIG. 4 is a sectional view of the heat exchanger jacket taken along line 4—4 and shows the double sheet construction and the cross-sectional shape of the working fluid and water passageways. By using a material such as copper, which has a comparatively high heat transfer coefficient and due to the arrangement and proximity of passageways 45 and 46, it should be apparent that the heat within the working fluid will be readily transferred by means of thermal conduction to the water.

An electric heating unit 34 is mounted to the side of hot water heater assembly 30. Heating element 34a of unit 34, extends through outer housing 50 and the wall of storage tank 29, and is immersed in the water within tank 29. As previously described, during periods when the internal atmosphere of the solar collector panels drops below a predetermined temperature, the working fluid is not circulated through jacket 28. During such conditions, heat will gradually be lost from the water within tank 29 due to conduction and convection. This heat loss is more rapid if hot water is used and cold water is introduced into the tank. Therefore, electric heating unit 34 is used to supplement the heat addition to the water in tank 29. When the water temperature in the tank drops below a predetermined level, a thermostat (not shown) within the tank transmits an electrical signal to heating unit 34 turning it "ON." Heating unit 34 maintains the water within the tank at an elevated temperature thereby compensating for heat losses, such that hot water is always available at the faucets. The use of a thermostat in combination with a heating unit and hot water heater is well known in the art and further details of the mechanical and electrical features are not thought necessary.

In order to efficiently utilize heat exchanger jacket 28 as part of heating system 20, it is wrapped around the outer diameter of the storage tank 29 of hot water heater 30. This is easily done once the outer housing 50 and inner insulation 51 are removed from around tank 29. With tank 29 exposed, heat exchanger jacket 28 is placed around approximately the lower half of tank 29 and is circumferentially secured to tank 29 by means of metal bands 52. These bands, three of which are shown, have ends which are turned outwardly to form facing flanges 53. As bolts 54 and nuts 55 are tightened, the flanges 53 are drawn toward each other, thereby securing jacket 28 around tank 29. By positioning and securing the exterior surface of passageways 45 and 46 tightly against the outer wall of tank 29, heat within jacket 28 will be conducted to the water within tank 29. It should be noted that although heat is supplied to jacket 28 only through the working fluid from the solar collector panels 21, this heat will be conducted throughout jacket 28 including the water passageways 46 as it circulates from and back to storage tank 29 and thus the entire jacket is responsible for heat transfer to water storage tank 29. This arrangement also heats the water within jacket 28 to provide a supplemental source of hot water back into tank 29, but also by the use of jacket 28, hot spot concentrations present in passageway 45 are dissipated throughout the jacket for more uniform water heating. Once heat exchanger jacket 28 is secured around water storage tank 29, the inner insulation 51 and the outer housing 50 of the hot water heater 30 are replaced. In this manner, heat transfer from jacket 28 is focused in one direction, inwardly toward tank 29.

Heat exchanger jacket 28 has been described as being circumferentially secured to tank 29 by means of three metal bands 52. If desired, these three metal bands could be deleted and as shown by heat exchanger jacket 28a in FIG. 7, the meeting edges of the heat exchanger jacket turned outwardly to form flanges 49. Registering holes 48 machined in these flanges may be used to receive a suitable fastening arrangement in order to draw the flanges toward each other. If this alternate form of heat exchanger jacket construction is employed, the design of the tubes 36 and 38 as well as the working fluid tubes may be modified slightly in their manner of exit from jacket 28a so as not to interfere with these formed flanges.

The water heating system which has been described utilizes solar energy for heating water stored in a conventional hot water heater. An important feature of this system is the heat exchanger jacket. Although the various figures may suggest that heat exchanger jacket 28 is a component part of hot water heater assembly 30, it is to be understood that the hot water heater used need not be of a special design which is supplied with jacket 28 (or 28a) already installed. Rather, virtually any home hot water heater can be converted to the jacketed arrangement of heater assembly 30 as disclosed. In order to make such a conversion, the outer housing 50 is removed and the inner insulation is taken off. This exposes the outer surface of the water storage tank. At this point, jacket 28 or 28a, obtained as a separate unit, is wrapped around the tank and tightly secured thereto as previously described. Once the jacket is in place, the inner insulation 51 is replaced and outer housing 50 is secured in place. This type of conversion is easily and quickly accomplished and provides a home owner a low-cost way to utilize his existing hot water heater as part of the water heating system described herein.

An adequate tank size for most residential needs would be an 80–90 gallon capacity. In order to heat such a capacity effectively, it has been found that two solar collector panels each having approximately 18 square feet of panel area for receiving radiant energy and one heat exchanger of approximately 18 square feet of surface area are adequate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A water heating system which comprises:
a solar collector panel having a first passageway cooperating therewith;
a conventional hot water heater assembly having a storage tank therein and a heating device associated with said tank for heating stored water in the tank independent of solar energy;
a heat exchanger jacket having a second passageway and a third passageway therein, said second passageway coupled in a continuous flow loop with said first passageway in said collector panel;
said continuous flow loop having a working fluid therein;
pumping means operable for circulating said working fluid through said continuous flow loop;
fluid transfer means operable for circulating water from within said storage tank through said third passageway and back into said storage tank; and means circumferentially securing said heat exchanger jacket around said storage tank in direct contact with said tank for heat transfer directly from said jacket by conduction to said tank.

2. The water heating system of claim 1 which further comprises a temperature-sensing device coupled to said pumping means and to said fluid transfer means and operable to shut off said pumping means and said fluid transfer means when a predetermined temperature is sensed.

3. The water heating system of claim 2 in which said temperature-sensing device is a thermostat positioned within said solar collector panel.

4. The water heating system of claim 1 which further comprises a solenoid valve operable to close off the circulation of water from said storage tank to said third passageway.

5. The water heating system of claim 4 which further comprises a temperature-sensing device operable to shut off said pumping means and said fluid transfer means when a predetermined temperature is sensed.

6. The water heating system of claim 1 in which said heat exchanger jacket is of a construction such that said second and said third passageways are arranged as a double serpentine coil formed in a pair of sheets.

7. The water heating system of claim 1 in which said securing means comprises a plurality of metal bands whose ends are drawn together and secured, thereby circumferentially tightening said jacket around the water heater.

8. The water heating system of claim 7 which further comprises a solenoid valve operable to close off the circulation of water from said storage tank to said third passageway.

9. The water heating system of claim 8 which further comprises a temperature-sensing device operable to shut off said pumping means and said fluid transfer means when a predetermined temperature is sensed.

10. The water heating system of claim 9 in which said heat exchanger jacket is of a construction such that said second and said third passageways are arranged as a double serpentine coil formed in a pair of sheets.

11. The water heating system of claim 10 in which said pumping means comprises a first pump positioned within the continuous flow loop and coupled to a source of electrical energy.

12. The water heating system of claim 11 in which said fluid transfer means comprises:
a transfer pipe connecting said storage tank to one end of said third passageway;
a second pump in line with said transfer pipe; and
said second pump being coupled to said source of electrical energy.

13. The water heating system of claim 12 in which said hot water heater further comprises an outer housing and insulation which are arranged around said heat exchanger jacket, with the insulation against the outside of the jacket and the outer housing against the outside of the insulation.

14. The water heating system of claim 13 in which an inlet pipe connects said transfer pipe to said hot water heater and an outlet pipe connects said hot water heater to an external water use location.

15. The water heating system of claim 1 in which the said heat exchanger jacket has end portions which are turned outwardly to form flanges having registering holes therein, the flanges drawn together to circumferentially tighten around the hot water heater, said flanges comprising said securing means.

16. The water heating system of claim 1 in which said heating device is an electrical heating element.

17. A method of converting a water heating system to a solar supplemented heating system comprising the steps of:
taking a conventional water heater assembly having a storage tank with an outer housing and inner insulation, and removing from the tank, the outer housing and insulation to expose the storage tank;
securing to the exposed storage tank, a heat exchanger jacket wrapped around at least the lower half of the tank and circumferentially securing it to the tank;
reinstalling the insulation around the jacket and tank and reinstalling the outer housing around the insulation;
establishing communication of the interior of the tank with one of two serpentine passageways in the jacket to provide a circulation loop for water in the tank through one of the passageways in the jacket and back into the tank; and
providing a solar collector and establishing a circulation loop for working fluid through the solar collector and through another of the serpentine passageways in said jacket.

18. The method of claim 17 and further comprising the steps of:
controlling flow in the water circulation loop in the jacket by a solenoid-operated water control valve, to enable or disable flow of water through said loop.

19. The method of claim 18 wherein:
the step of controlling the water flow in the water circulation loop is by concurrently controlling a water pump and the solenoid-operated valve in said water circulation loop.

20. The method of claim 19 wherein:
the step of controlling the solenoid valve and pump is accomplished by the step of sensing the temperature of the working fluid in the vicinity of the solar collector and terminating pump operation and closing the solenoid valve in response to the sensing of a temperature below a pre-determined established desired level.

21. The method of claim 17 wherein:
said step of securing includes drawing together and securing a plurality of metal bands around the double serpentine passageway jacket to secure the jacket tightly against and in contact with the water storage tank itself in the water heater.

22. The method of claim 17 wherein:
the step of securing the jacket to the water heater comprises the steps of drawing toward each other, flanges on opposite ends of the jacket and tightening the jacket against and in direct tight contact with the water storage tank.

* * * * *